United States Patent
Pruett et al.

(10) Patent No.: US 6,263,440 B1
(45) Date of Patent: Jul. 17, 2001

(54) TRACKING AND PROTECTION OF DISPLAY MONITORS BY REPORTING THEIR IDENTITY

(75) Inventors: Gregory B. Pruett, Durham; Gregory W. Kilmer, Raleigh; Barry B. Khatri, Cary, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/113,945

(22) Filed: Jul. 10, 1998

(51) Int. Cl.[7] .............................. G06F 11/30; G06F 7/04; G05B 23/02
(52) U.S. Cl. ............... 713/200; 340/825.11; 340/825.15; 340/825.17; 340/825.32; 340/825.36
(58) Field of Search ..................................... 713/200, 201, 713/202; 340/825.11, 825.15, 825.17, 825.1, 825.32, 825.36

(56) References Cited

U.S. PATENT DOCUMENTS

| | | | |
|---|---|---|---|
| 5,377,269 | * 12/1994 | Heptig et al. | 380/25 |
| 5,715,174 | * 2/1998 | Cotichini et al. | 364/514 R |
| 5,787,174 | * 7/1998 | Tuttle | 380/23 |
| 5,802,280 | * 9/1998 | Cotichini et al. | 395/200.3 |
| 5,892,441 | * 4/1999 | Woolley et al. | 340/539 |
| 5,943,029 | * 8/1999 | Ross | 345/11 |
| 5,959,529 | * 9/1999 | Kail, IV | 340/539 |
| 5,960,172 | * 9/1999 | Hwang | 395/186 |
| 6,087,937 | * 7/2000 | McCarthy | 340/567 |
| 6,160,477 | * 12/2000 | Sandelman et al. | 340/506 |

* cited by examiner

Primary Examiner—Norman M. Wright
(74) Attorney, Agent, or Firm—George E. Grosser; Joseph A. Sawyer, Jr.

(57) ABSTRACT

The present invention is directed toward a method, system and computer readable medium (the present invention) for reporting information related to a monitor attached to a computer which includes a system memory. The present invention includes electronically reading the information from the monitor and storing the monitor information in the system memory. The present invention further includes retrieving the monitor information from the system memory and providing the monitor information to a display via a browser. The monitor information comprises electronically readable information including its identity. One aspect of the present invention further includes comparing the monitor information with a corresponding last known information, wherein a mismatch indicates that the monitor has been changed. Another aspect of the present invention further includes copying the monitor information to a radio frequency (RF) enabled memory, wherein the monitor information can be logged utilizing an RF reader device. The RF reader device may be included in an RF gate and/or a hand held device. Computer systems with Radio Frequency Identification (RFID) technology configured in accordance with the present invention enable automated electronic tracking of computer assets such as the monitors as they pass through the RF gate in or out of a portal. Computer systems with the RFID technology also enable the automated electronic tracking of the monitors or other computer assets via the hand held device. In either case, no direct contact with the monitor is needed for the tracking and reporting.

18 Claims, 4 Drawing Sheets

TRACKING AND PROTECTION OF DISPLAY MONITORS BY REPORTING THEIR IDENTITY

FIELD OF THE INVENTION

The present invention relates to computer systems assets tracking and protection and more particularly to electronic tracking and protection of display monitors attached to computers.

DESCRIPTION OF RELATED ART

Personal computer and workstation systems (computers) are well known in the art. Computers include components such as hard disk drives, dual in line memories (DIMMs), single in-line memories (SIMMs), display monitors, central processing units (CPUs), and other components. Computers and their respective components, are highly valuable assets. At the same time, computers and computer components are easily portable and easily reconfigured. The more compact the computers and the computer components the easier it is to transport them. Moreover, the more conforming the computers and computer components are to industry standards the easier it is to reconfigure the computers with exchanged or stolen components.

Thus, assets management, misplacement and theft of computers and computer components present a major problem. As a result, there exists an ever increasing need for improved computer assets management and protection such as security for computers against the unauthorized removal or theft of their components.

In addition, today, computer networks (networks) are employed to provide increased computing power and efficiency to a plurality of computers which are located throughout a large area. Through the network, the plurality of computers are generally interlinked with each other and with a server system or a central processing center. However, the dissemination of the computers throughout the large area compounds the computer assets tracking and protection problem.

Computers provided by IBM Corporation currently carry a tamper detection switch, which can detect when a computer cover has been removed and causes the computers to be functionally disabled on subsequent boots until the user successfully enters an appropriate password. This and other similar mechanisms adequately protects the overall computer system but does not deter theft of the components within the computer, nor does it provide means for tracking computer assets.

Accordingly, a number of methods have been developed for guarding against the unauthorized removal of computer assets. One such method is the use of Electronic Article Surveillance (EAS) tags which are widely used in commercial markets for everything from clothing to Compact Disks. When an item with an EAS tag is carried through a portal, the portal sounds an audible alarm to notify security of a tamper event. The EAS tags are attached or embedded in computer systems to provide a notification of when an asset is removed.

Although useful for retail applications, EAS technology is less effective for protecting corporate assets such as computers and computer components. Opportunities may exist for employees to defeat the technology by removing the tags, transferring components through a mail service, or reusing components in other computers within the building.

It is therefore desirable to provide a system and method that provide electronic tracking and protection of computer assets. Particularly, obtaining and reporting information associated with display monitors is needed. The tracking and protection of computer assets should be automated and easily implemented in various computer systems environments. The present invention addresses such a need.

SUMMARY OF THE INVENTION

The present invention is directed toward a method, system and computer readable medium (the present invention) for reporting information related to a monitor attached to a computer which includes a system memory. The present invention includes electronically reading the information from the monitor and storing the monitor information in the system memory. The present invention further includes retrieving the monitor information from the system memory and providing the monitor information for viewing via a browser. The monitor information comprises electronically readable information including its identity.

One aspect of the present invention further includes comparing the monitor information with a corresponding last known information, wherein a mismatch indicates that the monitor has been changed. Another aspect of the present invention further includes copying the monitor information to a radio frequency (RF) enabled memory, wherein the monitor information can be logged utilizing an RF reader means.

The RF reader means may be included in an RF gate and/or a hand held device. Computer systems with Radio Frequency Identification (RFID) technology configured in accordance with the present invention enable automated electronic tracking of computer assets such as the monitors as they pass through the RF gate in or out of a portal. Computer systems with the RFID technology also enable the automated electronic tracking of the monitors or other computer assets via the hand held device. In either case, no direct contact with the monitor is needed for the tracking and reporting.

DETAILED DESCRIPTION OF THE INVENTION

Figure 1:
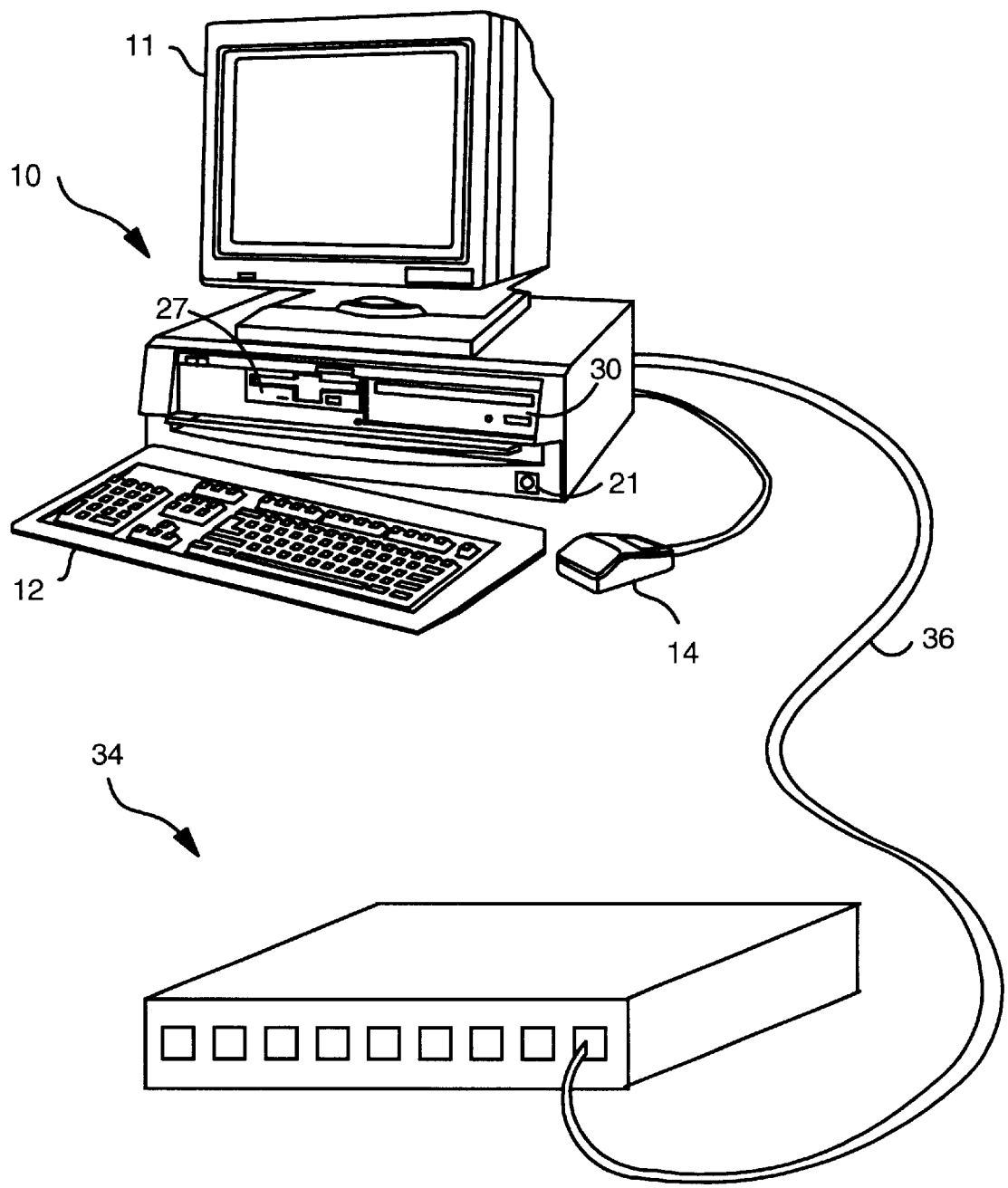
FIG. 1 illustrates a computer embodying the system and method in accordance with the present invention which can be connected to a network through a hub.

The present invention relates to computer systems assets tracking and protection and more particularly to electronic tracking and protection of display monitors attached to a computer. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

In accordance with the present invention, the system and method for an automated electronic tracking and protection of display monitors associated with a computer utilize display monitors identification for monitoring and reporting their presence. Display monitors specification may also be monitored and reported. Display monitors identification, also known as serialization information (serialization), includes information such as an identity or serial number.

Preferably, for tracking and protection of display monitors that conform with the Display Data Channel (DDC) standard, the system and method utilize the extended display identification (EDID) information that contains the display monitor identity and some specification or the video display identification format (VDIF) information that contains the full specification of the display monitor. The present invention takes advantage of the fact that the display monitor information, in this case the EDID and VDIF information, is electronically readable from the display monitor in that it uses this information for tracking and reporting the display monitors identification. Hence, any monitor which is adaptable to the DDC or other standard that display monitor manufacturers implement and which provides its identification in an electronically readable form may be suitably used in conjunction with the system and method in accordance with the present invention.

The identification of display monitors is preferably logged in a radio frequency (RF)-enabled EEPROM through a serial bus interface, and an RF reader obtains the identification through an RF link to the RF-enabled EEPROM. Preferably, the identification is also logged for future reference in a computer file which holds the last known computer configuration data.

Electronically retrieving and reporting of the identification of display monitors via a browser such as, in a preferred embodiment, a Desktop Management Interface (DMI) browser, and/or via the RF link to the RF reader, automates the tracking and protection of the display monitors. The RF reader can be included, for example, in RF gates installed in portal entryways or in hand held devices. Hence, there is no need for direct connection to the display monitors in order to provide the automated electronic tracking and protection thereof.

In the preferred embodiment, the system and method in accordance with the present invention additionally utilize a software program such as, for example, the AssetCare software program by IBM corporation, for implementing the automated tracking and protection of the display monitors. In this case, the software program is executed by the computer under an operating system such as Windows NT, Windows 95, or OS/2. The operating system and the software program each comprises computer readable instructions which, in general, are tangibly embodied in or are readable from a media such as a system memory, data storage devices including hard disk drives, and/or a data communications device. When executed by the computer, the instructions cause the computer to perform steps associated with implementing the present invention. Thus, the automated tracking and protection of the display monitors may be implemented as a method, system, or an article of manufacture (a computer-readable media or device) using programming and/or engineering techniques to produce software, hardware, firmware, or any combination thereof.

The present invention is implemented in personal computer and workstation systems (computers) as hereafter described. A computer 10 embodying the system and method in accordance with the present invention is illustrated in FIG. 1. The computer 10 typically has an associated display monitor 11, keyboard 12, mouse 14, and printer or plotter (not shown). The computer 10 is typically connected to a network of one type or another including Ethernet, Token Ring, ATM, or other mechanism used to transmit data.

In the preferred embodiment the network is a local area network (LAN). A LAN attachment is provided, for example, through hub 34 which is connected to the computer 10 via a cable 36, wherein effective communication may be established with other computers through links comprising electrically conductive connections and/or radiation links including fiber optic links and infrared links. The other computers may be physically remote from or, conversely, adjacent to computer 10. Each of the computers may be a personal computer or workstation system in the form of a desktop, floor standing or portable computer. Alternatively, one or more of the computers may comprise a computer system which is different than the personal computer or workstation systems in that it is differently configured and/or it has different functional capabilities.

Figure 2:
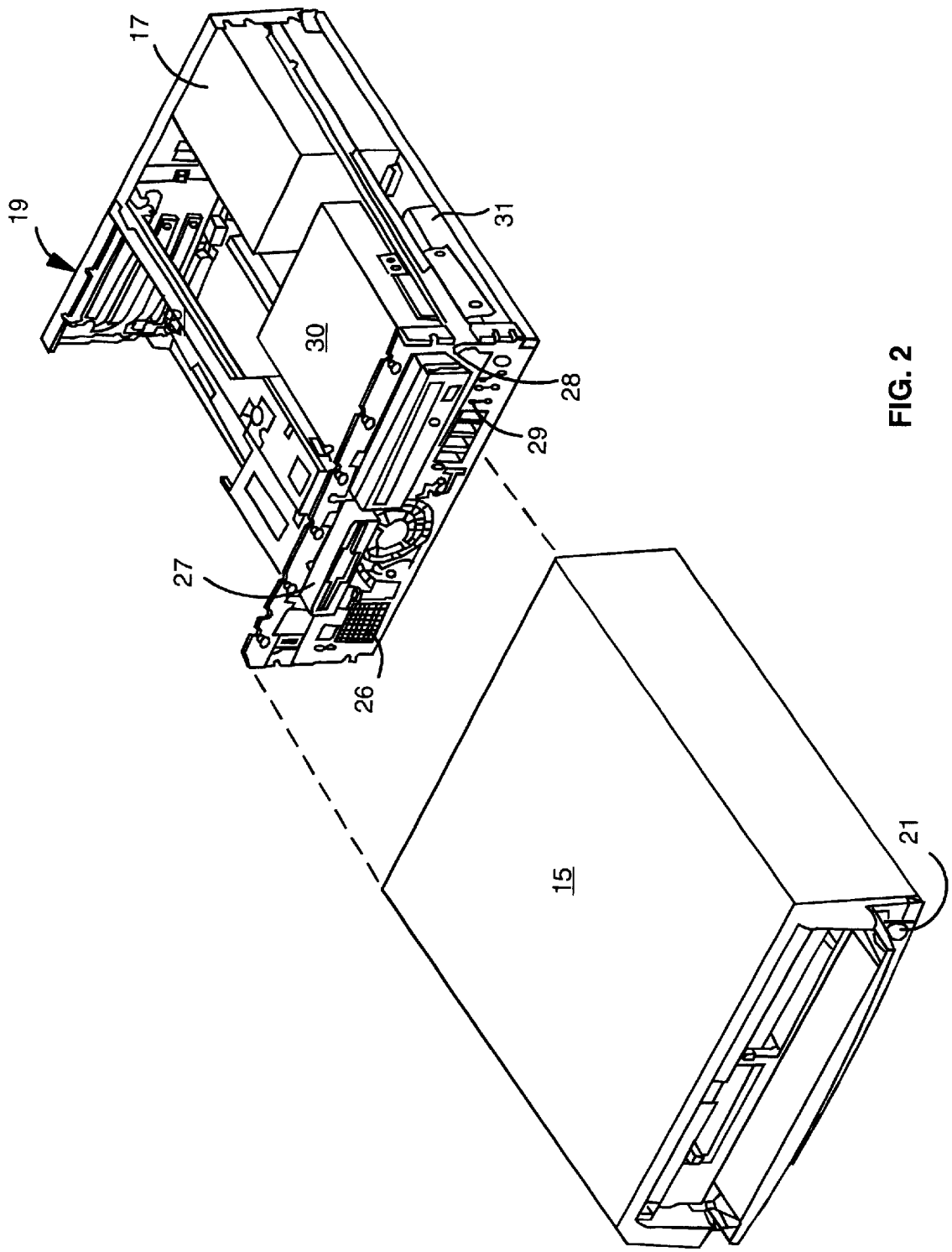
FIG. 2 is a more detailed description of the computer of FIG. 1 which embodies the system and method in accordance with the present invention.

A more detailed description of the computer 10 which embodies the system and method in accordance with the present invention is provided in conjunction with FIG. 2. As illustrated in FIG. 2, the computer 10 has a cover 15 which is a decorative outer member that cooperates with a chassis 19 in defining an enclosed, shielded volume for receiving electrically powered data processing and storage components for processing and storing digital data. At least some of these components are mounted on a multilayer planar 20 or motherboard which is mounted on the chassis 19. The multilayer planar 20 provides means for electrically interconnecting the components of the computer 10 including those identified above and such other associated components as floppy disk drives, various forms of direct access storage devices, accessory adapter cards or boards, and the like. Provisions are made in the planar 20 for the passage of input/output signals to and from the components of the computer 10.

The system 10 has a power supply 17, a power button 21, also herein referred to as switch 21. In the illustrated form, the chassis 19 defines a pair of upper bays 26, 28 and a lower bay 29. One of the upper bays 26 is adapted to receive peripheral drives of a first size (such as those known as 3.5 inch drives) while the other 28 is adapted to receive drives of a different size (such as a CD ROM drive). The lower bay is adapted to receive another drive. One floppy disk drive is indicated at 27 in FIGS. 1 and 2, and is a removable medium direct access storage device (DASD) capable of receiving a diskette inserted there into and using the diskette to receive, store and deliver data as is generally known. One CD ROM drive is indicated at 30, both in FIGS. 1 and 2, and is a removable medium direct access storage device capable of receiving a compact disc inserted there into and using the disc to deliver data as is generally known. One hard disk drive is indicated at 31 in FIG. 2 and is a fixed medium direct access storage device (hard disk drive) capable of storing and delivering data as is generally known.

Figure 3:
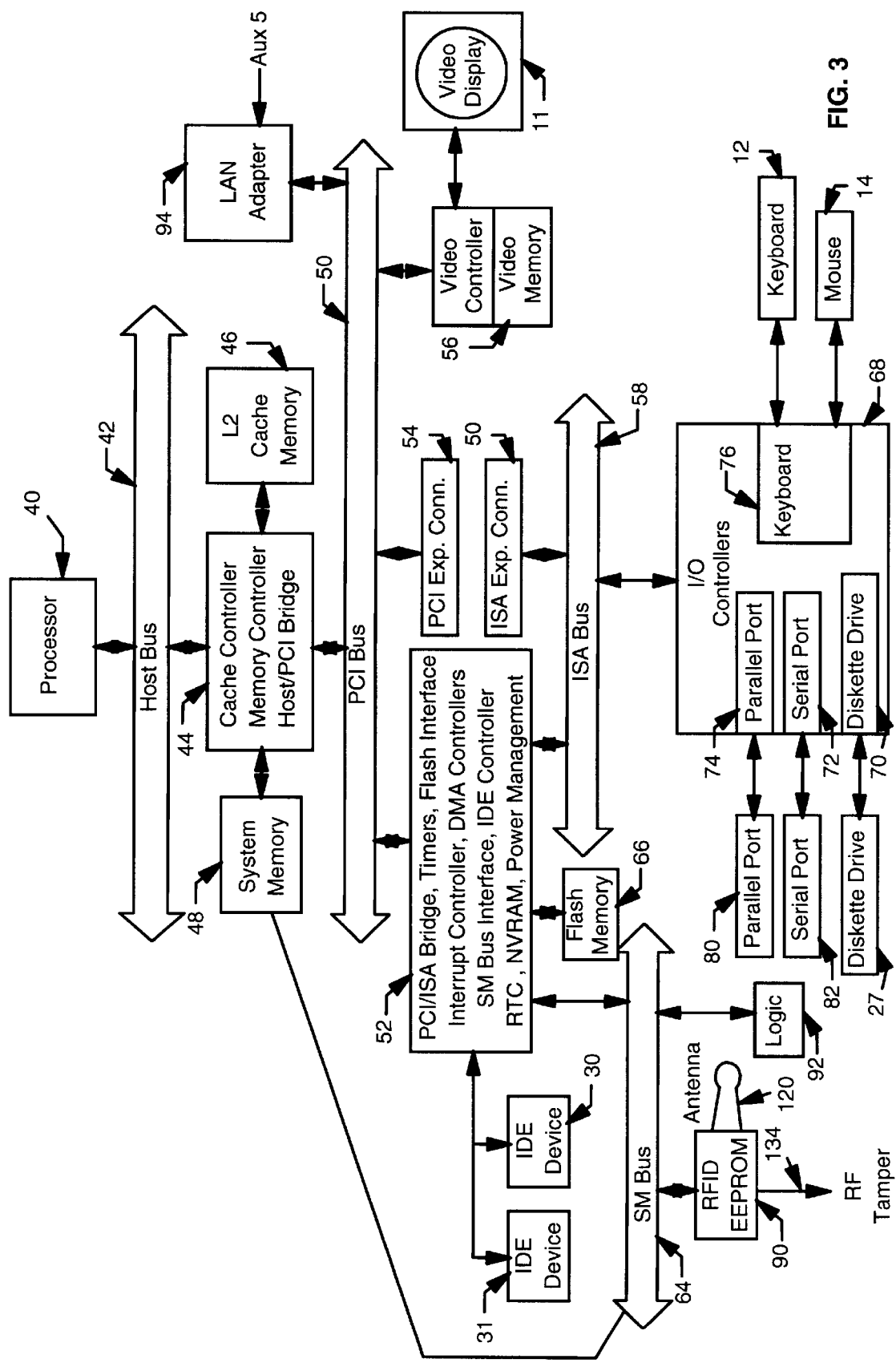
FIG. 3, illustrates a block diagram of a computer configured in accordance with the present invention such as the computer of FIGS. 1 and 2.

The above described computer 10 of FIGS. 1 and 2 is described in further detail in conjunction with FIG. 3. FIG. 3, illustrates a block diagram of a computer configured in accordance with the present invention such as the computer 10 of FIGS. 1 and 2. The computer 10 includes the planar 20 for mounting components on the planar 20. The planar 20 is connected to input/output (I/O) expansion connectors and other computer hardware such as the system central processing unit (CPU) or processor 40, which is further connected to a high speed CPU host bus 42.

Connected to the high speed CPU host bus 42 are also a first system core logic chipset 44 and an L2 cache memory 46. The first chipset 44 can be, for example, a Triton VX chip by Intel Corporation. The first chipset 44 includes a memory control unit, a cache controller and a peripheral component interconnect (PCI) bridge. The cache controller is operatively coupled to the L2 cache memory 46. The memory control unit includes memory mapping logic for mapping CPU 40 addresses to particular address spaces in system memory 48. The memory control unit is coupled to the system memory 48.

The system memory 48 includes a random access memory (RAM). The system memory 48 may also include and one or more of dual in-line memory modules (DIMMs) and single in-line memory modules (SIMMs). The system memory 48 may be further connected to a low speed serial bus such as an $I^2C$ bus or a System Management (SM) bus 64.

The PCI bridge within the first chipset 44 provides an interface between the CPU host bus 42 which is used as a local bus and a PCI bus 50. Coupled to the PCI bus 50 is a second core chipset 52. The second chipset 52 can be, for example, a PIIX4 chip by Intel Corporation. The second chipset 52 contains a bus control and timing unit, a plurality of timers, an interrupt controller, a direct access memory (DMA) unit, nonvolatile CMOS RAM, also herein referred to as NVRAM, a CMOS real-time clock (RTC), an SM bus controller, a PCI/ISA bridge, flash memory interface, power management logic and an integrated drive electronics (IDE) controller.

Attached to the flash memory interface in the second chipset 52 is a flash memory module or chip 66. Flash memory is in general a non-volatile memory that can be electrically erased and reprogrammed in the circuit. Flash memory does not require continuous power to retain its memory contents. Thus flash memory is typically used as non-volatile storage for the BIOS (basic input/output system) and the instructions that start the computer.

The NVRAM is used to store computer system configuration data. That is, the NVRAM will contain values which describe the present configuration of the computer including the types of components associated therewith, the amount of system memory, etc. These values are stored in NVRAM and updated whenever a special configuration program, such as configuration/setup, is executed.

The RTC within the second chipset 52 is used for time of day calculations within the computer system (hence, system RTC). In one embodiment, a logic 92 contains a duplicate of the system RTC. This duplicate RTC herein referred to as a tamper RTC contains a shadow of the system RTC but the tamper RTC can be stopped by a tamper event (such as removal of the computer cover).

The power management logic within the second chipset 52 manages switching between computer power states such as off, standby, sleep, suspend and normal operating states. The present invention will operate in any of these power states. Accordingly, the description that follows will be independent of power state.

The PCI/ISA bridge within the second chipset 52 provides an interface between the PCI bus 50 and an optional feature or expansion bus such as the Industry Standard Architecture (ISA) bus 58. Coupled to the ISA bus 58 is a multi-function I/O controller 68 such as the PC87307 by National Semiconductor. The I/O controller 68 contains a variety of I/O adapters and other components such as a diskette adapter 70, a serial adapter 72, a parallel adapter 74 and a keyboard controller 76. The diskette adapter 70 provides an interface to the diskette drive 27. The serial adapter 72 has an external port connector 82 for attachment of external devices such as a modem (not shown). The parallel adapter 74 has an external port connector 80 for attachment of external devices such as printers (not shown). The keyboard controller 76 is the interface for the keyboard 12 and the mouse 14. Additionally coupled to the ISA bus 58 are a plurality of ISA expansion connectors 60 for receiving ISA adapter cards (not shown).

The IDE controller within the second chipset 52 interfaces with IDE compatible storage devices such as the hard disk drive 31 and CD-ROM drive 30. However, one of ordinary skill in the art can readily recognize that the computer 10 may alternatively be configured to support any hard disk drive(s) including either one or both of the IDE compatible and small computer system interface (SCSI) compatible hard disk drives.

In addition to the second chipset 52, coupled to the PCI bus 50 are a plurality of PCI expansion connectors 54 for receiving PCI bus compatible peripheral cards. One such peripheral card is a display controller 56. The display controller 56 includes a display memory and is coupled to the display monitor or terminal 11. Preferably, the display monitor 11 is adaptable to the DDC protocol and is configured to provide the EDID and or VDIF data structures. That is, the EDID and VDIF are electronically readable from the respective display monitor.

A LAN adapter or subsystem 94 can be coupled to either the PCI bus 50 or the ISA bus 58 for allowing the computer 10 to communicate with the LAN via a connection or link 36 to hub 34 (FIG. 1). The LAN adapter is supplied with auxiliary power (AUX5) from the power supply 17 when the system 10 is off. The LAN adapter can be, for example, the Auto Wake Token-Ring ISA Adapter by IBM corporation.

Further, a planar SM Bus 64 is coupled to the PCI bus 50 and the ISA bus 58 via the SM bus controller within the second chipset 52. The planar SM Bus 64 is an additional I/O bus in computer 10 and is used as a local bus to support slow speed peripheral devices. Logic 92 is coupled to SM bus 64.

An RFID (Radio Frequency Identification) EEPROM 90 is coupled to the SM Bus 64 and an RF interface. In a preferred embodiment, the RFID EEPROM 90 is a dual ported non-volatile memory element with both a digital serial ($I^2C$) and an RF interface. Hence, is it an RF-enabled EEPROM. The non-volatile memory provides storage for computer assets information such as components serial number including the memory modules serial number 49 and code revisions for the computer 10. The RFID EEPROM 90 can be updated through a digital interface that connects to the SM bus 64 or through the RF interface which connects to an antenna 120 which provides the RF link to the RF reader.

While the present invention is described hereinafter with particular reference to the block diagram of FIG. 3, it is to be understood that the system and method in accordance with the present invention may be used with other hardware configurations, including different planar board configurations. For example, the system processor 40 can be an Intel Pentium processor, Cyrix 586-P75 processor or Advanced Micro Devices 80486 processor or any other suitable processor.

As previously stated, the present invention preferably uses the EDID or VDIF for tracking and protection of display monitors that conform with the DDC standard. The display monitor information (EDID or VDIF) is typically presented using defined management information format (DMTF) and it includes information such as a manufacturer indication, a model code, and an identity or serial number. Several DDC standard types exist as is well known in the art. (Information about the DDC standard may be found in the Display Data Channel Proposal document, Version 1p, Revision 1–74p, dated Aug. 26, 1995, which is published by the Video Electronic Standards Association, San Jose, Calif.)

Two DDC standard types are DDC1 and DDC2. The DDC1 standard defines a uni-directional display data channel from the display monitor to the host computer which carries continuous transmission of the EDID information. The DDC2 standard defines a bi-directional display data channel based on a serial bus protocol such as the $I^2C$ bus protocol. The data is synchronized with a clock signal and typically the timing complies with the $I^2C$ bus specification. In a DDC2B mode of the DDC2 standard, the only transmission from the host computer to the display monitor is a request for either the EDID or VDIF. That is, in the DDC2B mode the DDC2 standard produces a semi-bi-directional display data channel, wherein the request for the EDID or VDIF is issued by the host computer and the EDID or VDIF are provided by the display monitor in response to the request.

The present invention takes advantage of the fact that the EDID and VDIF are electronically readable from their respective display monitors in that it uses this information for tracking and reporting the display monitors identification. Hence, it should be understood that any monitor which is adaptable to the DDC or other standard that display monitor manufacturers implement and which provides its identification in an electronically readable form may be suitably used in conjunction with the system and method in accordance with the present invention. In the preferred embodiment, both the display monitor and the display controller conform with the DDC standard in the DDC2B mode.

In the preferred embodiment, in order to retrieve the EDID and VDIF information a communication protocol is followed including the issuing of read commands. One sequence during which the communication protocol is followed is a power-up or system start-up sequence. After the computer has been powered on, the power-up sequence commences during which a Power On Self Test (POST) is performed. The POST is executed every time the computer is powered on, and it cannot be disabled by the computer user. The POST preferably includes execution of a program code (POST code). The POST code is preferably stored in the flash memory which typically is used for the BIOS. During execution of the POST, a process of retrieving the display monitor EDID (or VDIF) information is performed, wherein the EDID (or VDIF) is stored in the system memory. After the power-up sequence has ended and the operating system boot-up process has completed, the EDID information in the system memory is then used for the tracking and reporting of the display monitor identification.

Figure 4:
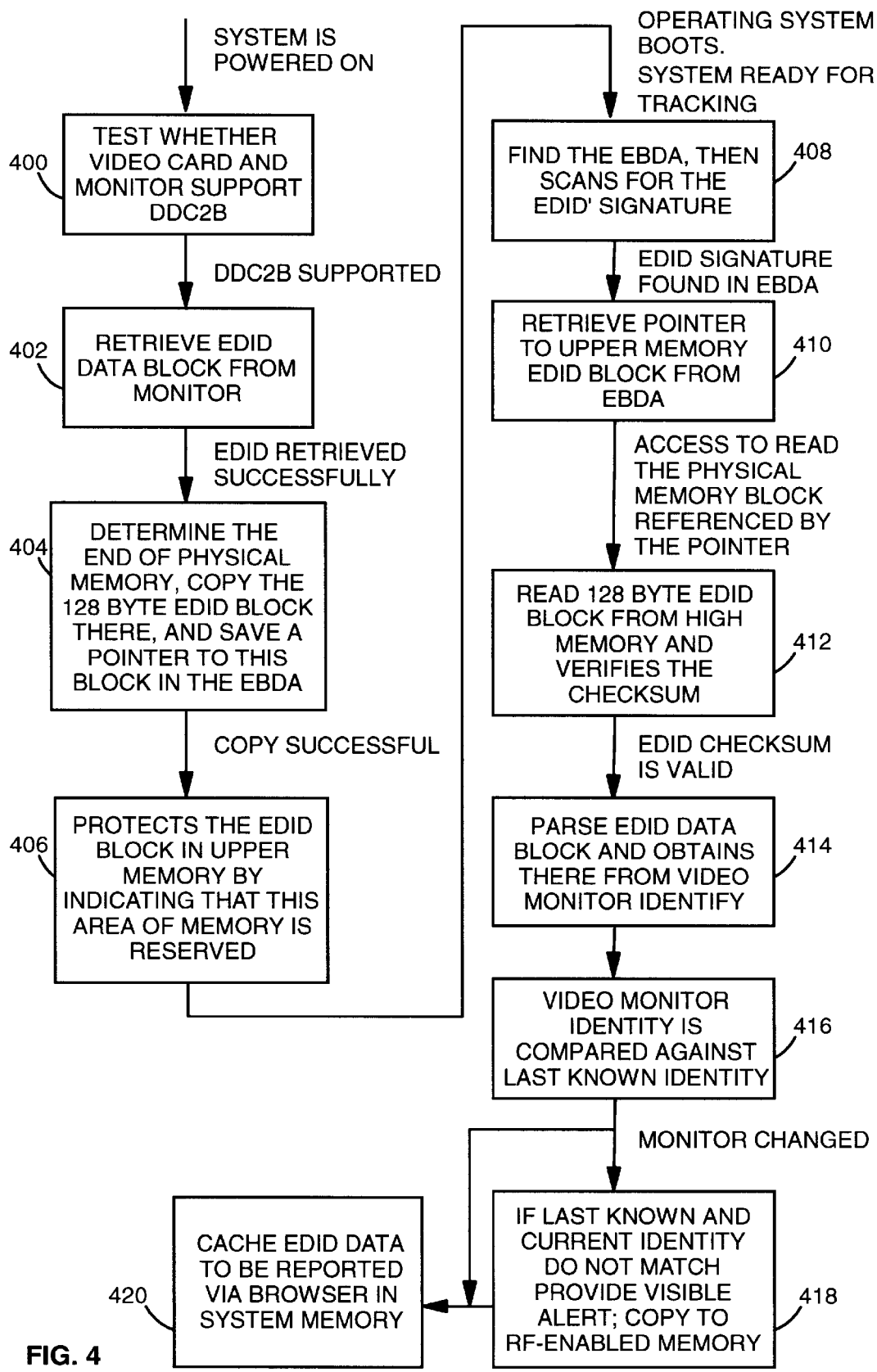
FIG. 4 is a flow diagram illustrating the process, in the preferred embodiment, of retrieving the EDID or VDIF information and using this information for the tracking and reporting of the display monitor identification.

FIG. 4 is a flow diagram illustrating the process, in the preferred embodiment, of retrieving the EDID or VDIF information and using this information for the tracking and reporting of the display monitor identification. It should be understood that, even though the process illustrated in FIG. 4 is described hereafter in terms of the DDC standard and particularly in terms of the DDC2B mode, other standards that display monitor manufacturers implement and which support identification in an electronically readable form may be suitably used in conjunction with the present invention without departing from the scope and spirit of the present invention.

As illustrated in FIG. 4, during the POST, it is determined whether the display controller card and display monitor conform with the DDC2B mode of the DDC standard (DDC standard) by, for example, executing an INTx10 function call, via step 400. It is noted that different operating systems may handle the system calls in a different way because different operating system have different device driver layers and file control mechanisms.

If it is determined that either the display controller card or the display monitor does not conform with the DDC standard, as when there is no valid response from either one of them, then the process ends. If it is determined that both the display controller card and the display monitor conform with the DDC standard then a read EDID command (or read VDIF command) is issued in order to retrieve the EDID (or VDIF) information from the display monitor, via step 402. For example, in the preferred embodiment, an INT 0x10 function call is issued in order to read the 128-byte block of the EDID or VDIF (hereafter collectively EDID) information from the display monitor. The EDID information is successfully retrieved from the display monitor unless there is a hardware failure, in which case, the POST execution will attend to this failure (not shown).

Next, it is determined where the upper range of the system memory is located, that is, the highest 128 bytes are found into which the EDID data block is copied, via step 404. The EDID data block is stored in a table format such as the MIF (Management Information File) and it includes, for example, the manufacturer indication, the model code, and the serial number. The EDID information is stored in the upper range of the system memory in order to avoid it being overwritten by operating system functions upon subsequent boot-up sequences. The pointer to this 128-bytes block of memory is saved, also via step 404. The pointer is saved in an extended BIOS data area (EBDA) and can be found, for example, by searching the EBDA for the signature letters 'EDID'.

Then, to protect the 128-bytes block in the upper range of the system memory, it is indicated that this area of memory is reserved, via step 406. For example, in the preferred embodiment, the INT 0x15 function 0xE820 is modified to indicate that this area of the system (physical) memory is reserved. The reserved area of the system memory will thereafter be protected from being overwritten by the operating system during subsequent boot-up sequences. That is, the above mentioned INT 0x10 function is thereafter disabled.

Once the power-up sequence (including the POST) has ended, the operating system boot-up process commences (not shown). During the operating system boot-up process, in the preferred embodiment, the software program such as, for example, the AssetCare software program, is loaded into the system memory. Upon completion of the operating system boot-up process, the system is ready for the automatic tracking of the display monitor as hereafter described.

Accordingly, the EBDA is found and scanned for the 'EDID' signature in order to find the pointer to the reserved area, via step 408. For example, in the preferred embodiment, address 0040:000E is accessed to first determine the location of the EBDA, then the pointer, a 32-bit address value, is retrieved therefrom, wherein the pointer is used to reference the reserved area. Access to the reserved area in the system memory is gained, for example, by using a device driver in a Component Instrumentation module of the AssetCare software program.

Next, the EDID information is read from the system memory and a checksum of the EDID information is verified to ensure its validity, via step 412. The EDID information is then parsed and the display monitor identity (or serial number) is obtained therefrom, via step 414. The display monitor identity is compared against a corresponding last known identity in order to determine if the display monitor has been changed, via step 416.

If the display monitor has been changed, a visible alert is provided for viewing via the browser and, in addition, the display monitor identity is copied to the RF-enabled memory (i.e., RFID EEPROM), via step 418. The EDID information is cached in the system memory for reporting the same through the browser, via step 420.

As indicated, in the preferred embodiment, after retrieving the display monitor information, the system and method report this information via the DMI browser and/or the RF link to the RF reader, hence the automated tracking of the display monitors. The information can be viewed locally by the computer operator via the browser, or it can be retrieved by a system administrator across the network using, for example, system management software that supports DMI protocol (e.g. LANDesk or IBM NetFinity system management software).

The above described automated tracking of the display monitors may utilize the RF link to the RF reader(s) in conjunction with RF gates to provide the display monitors protection by surveying their identity as they pass through the RF gates in or out of a portal. The the RF link to the RF reader(s) in conjunction with the hand held RF enabled device may be utilized for retrieving the information of the display monitor in it proximity, wherein the display monitor information can be electronically monitored without having to form a direct physical contact with the display monitor. Additionally, the reporting of the information through the browser such as, the DMI browser in the preferred embodiment, can be adopted as an industry-standard mechanism for accessing computer assets information for automated inventory purposes as well as for the automated tracking and protection. Hence, the present invention creates a paradigm for the automated electronic tracking and protection of computer assets and particularly the display monitors.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for reporting information related to a monitor attached to a computer which includes a system memory, the method comprising the steps of:
    a) electronically reading the information from the monitor;
    b) storing the monitor information in the system memory;
    c) retrieving the monitor information from the system memory; and
    d) providing the monitor information for viewing via a browser.

2. The method of claim 1, wherein the providing step (d) further includes the step of:
    d1) comparing the monitor information with a corresponding last known information, wherein a mismatch indicates that the monitor has been changed.

3. The method of claim 2, wherein the providing step (d) further includes the step of:
    d2) producing a visible alert if it is determined that the monitor has been changed.

4. The method of claim 3, wherein the method further includes the step of:
    e) copying the monitor information to a radio frequency (RF) enabled memory if it is determined that the monitor has been changed, wherein the monitor information can be logged utilizing an RF reader means which, together with the visible alert, enables an automated tracking and protection of the monitor.

5. The method of claim 4, wherein the monitor information includes an identity of the monitor.

6. The method of claim 5, wherein the identity includes a serial number.

7. The method of claim 4, wherein the browser includes a desktop management interface (DMI) browser.

8. The method of claim 7, wherein the DMI browser is used for local viewing of the serial numbers on the display.

9. The method of claim 8, wherein the browser further includes a DMI protocol compatible system management means for viewing the serial numbers across a network.

10. The method of claim 4, wherein the RF enabled memory comprises an RF identification (RFID) EEPROM.

11. The method of claim 10, wherein the RFID EEPROM comprises a dual-ported non-volatile memory with both digital serial and RF interfaces, and wherein the RFID EEPROM can be updated via both a digital serial and RF interfaces.

12. The method of claim 4, wherein, the RF-enabled memory is linked to the RF reader means through an antenna, and wherein the monitor information can be electronically monitored without having to form a direct physical contact with the monitor.

13. A system for reporting information related to a monitor attached to a computer which includes a system memory, the system comprising:
    means for electronically reading the information from the monitor;
    means coupled to the reading means for storing the monitor information in the system memory;
    means coupled to the system memory for retrieving the monitor information from the system memory; and
    means coupled to the retrieving means for providing the monitor information for viewing via a browser.

14. The system of claim 13, wherein the providing means further includes:
    means for comparing the monitor information with a corresponding last known information, wherein a mismatch indicates that the monitor has been changed; and
    means coupled to the comparing means for producing a visible alert if it is determined that the monitor has been changed.

15. The system of claim 14, wherein the system further includes means for copying the monitor information to a radio frequency (RF) enabled memory, wherein the monitor information can be logged utilizing an RF reader means which, together with the visible alert, enables an automated tracking and protection of the monitor.

16. A computer readable medium including program instructions for reporting information related to a monitor attached to a computer which includes a system memory, the program instructions for:
    a) electronically reading the information from the monitor;

b) storing the monitor information in the system memory;

c) retrieving the monitor information from the system memory; and d) providing the monitor information for viewing via a browser.

17. A method for reporting information related to a monitor attached to a computer which includes a system memory, the method comprising the steps of:

a) electronically reading the information from the monitor;

b) storing the monitor information in the system memory;

c) retrieving the monitor information from the system memory;

d) providing the monitor information for viewing via a browser; and e) copying the monitor information to a radio frequency (RF) enabled memory if it is determined that the monitor has been changed, wherein the monitor information can be logged utilizing an RF reader means which, together with the visible alert, enables an automated tracking and protection of the monitor, wherein the RF enabled memory comprises an RF identification (RFID) EEPROM, and wherein the RFID EEPROM comprises a dual-ported non-volatile memory with both digital serial and RF interfaces, whereby the RFID EEPROM can be updated via both a digital serial and RF interfaces.

18. A method for reporting information related to a monitor attached to a computer which includes a system memory, the method comprising the steps of:

a) electronically reading the information from the monitor;

b) storing the monitor information in the system memory;

c) retrieving the monitor information from the system memory;

d) providing the monitor information for viewing via a browser; and e) copying the monitor information to a radio frequency (RF) enabled memory if it is determined that the monitor has been changed, wherein the monitor information can be logged utilizing an RF reader means which, together with the visible alert, enables an automated tracking and protection of the monitor, wherein the RF-enabled memory is linked to the RF reader means through an antenna, and wherein the monitor information can be electronically monitored without having to form a direct physical contact with the monitor.

* * * * *